C. G. WELCH.
Brake Pipe Coupling and Valve.
No. 224,256. Patented Feb. 3, 1880.
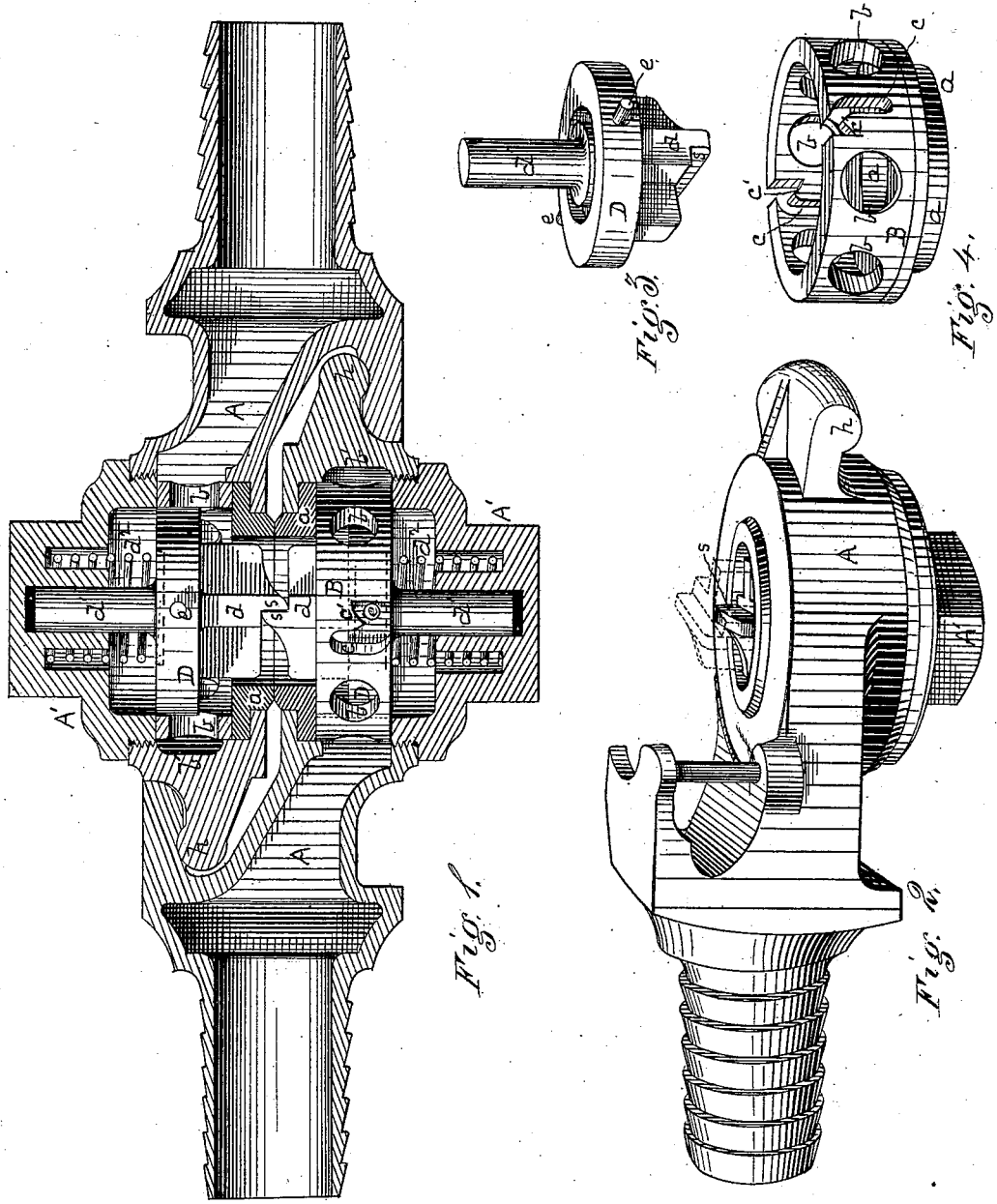

UNITED STATES PATENT OFFICE.

CHARLES G. WELCH, OF HUNTINGDON, PENNSYLVANIA, ASSIGNOR TO GEORGE WESTINGHOUSE, JR.

BRAKE-PIPE COUPLING AND VALVE.

SPECIFICATION forming part of Letters Patent No. 224,256, dated February 3, 1880.

Application filed December 24, 1879.

*To all whom it may concern:*

Be it known that I, CHARLES G. WELCH, of Huntingdon, county of Huntingdon, State of Pennsylvania, have invented or discovered a new and useful Improvement in Brake-Pipe Couplings and Valves; and I do hereby declare the following to be a full, clear, concise, and exact description thereof, reference being had to the accompanying drawings, making a part of this specification, in which—like letters indicating like parts—

Figure 1 is a longitudinal sectional view (with interior devices partly in elevation) of a pair of couplings embracing my present improvement. Fig. 2 is a view, in perspective, of one half or part of the coupling. Fig. 3 is a detached view, in perspective, of the valve which I employ; and Fig. 4 is a detached view, in perspective, of the locking and packing rings.

The organization and mode of operation of the Westinghouse automatic brake require that the rear end of the brake-pipe should be closed when the train is in running condition; also, that when a car is run onto a siding and detached its brake-pipe should be closed at both ends. This has heretofore been done by the use of stop-cocks turned by hand.

Self-closing valves arranged in the couplings have heretofore been found impracticable in brake apparatus of this kind, for the reason that in case one or more cars become accidentally detached from the rest of the train such self-closing valves would close the escape-ports of the couplings and thereby prevent the brakes from going on.

I have devised a valve of such construction and combined it with the couplings in such way that in the operation of uniting two half-couplings by the usual rotary motion each valve will automatically unseat the opposite valve and leave an open through passage-way for the air; and when the half-couplings are rotated back by hand, in uncoupling, so as to disconnect them, the valves will be left free to resume their seats, and they will be held in that position by spring-power or by air-pressure, or both. Hence, when a train is made up and in running order the couplings between cars will have open ports, and the last coupling of the last car will have a closed port; also, if a car is detached, as soon as the couplings are uncoupled the coupling-ports will be closed, so that the brakes will not be thereby applied either to the wheels of the car so detached nor to the residue of the train; but the valves referred to are so made and combined with the coupling that when two couplings are pulled apart, as will be the case when one or more cars are accidentally detached, the valves will be automatically locked in an open position, so as to insure the automatic application of the brakes both to the wheels of the detached cars and to the rest of the train. In this way I secure the automatic closing of the coupling-ports when they ought to be closed, and prevent them from being closed when they ought to be open.

The Westinghouse clutch or lap-joint coupling A is so well known (see United States Patent No. 157,951, December 22, 1874; Reissue No. 8,291, June 8, 1878) that it needs no description.

The packing-rings $a$ are held to their places by the use of rings B, which are pressed down by the screw-caps A'. Each ring B has one or more holes, ports, or recesses, $b$, through which the air passes, and in order to facilitate the flow of air an annular chamber, $b'$, may extend part or all the way around each ring. Each valve D has a seating-face to rest on its packing-ring $a$, and make a tight joint therewith when seated, and also a piston-like periphery, which, playing inside its ring B, keeps the valve properly in line. The valve is also guided by the front winged stem, $d$, and the back stem, $d'$, and is backed by a spring, $d^2$, the tendency of which is to seat the valve.

The ring B has also a slot or slots, $c$, each of a depth equal or about equal to the throw of the valve D. One side of each slot or recess $c$ is cut away so as to give a shoulder, $c'$, at or about the proper point for the engagement therewith of a pin, $e$, which projects from the valve D when the latter is thrown back from its seat. The ends of the stems $d$ are halved or otherwise formed, so as to engage each other in the act of uniting the couplings, as shown at $s$, the cut-away part being on the side toward the free end of the coupling.

The parts thus described are incorporated into the coupling in such manner that their operation shall be substantially as follows: In coupling, the two half-couplings are brought together at an angle or out of line a distance measured by the length of the hook $h$. At that time each valve D is on its seat on the packing-ring $a$, and its stem $d$ projects, as indicated by dotted lines in Fig. 2, and the pins $e$ are at the bottom of the recesses $c$. Each valve presses back or unseats the other, and the couplings are united by a rotary motion in the usual way; but just before the half-couplings come into line with each other the shoulders $s$ of the stems $d$ engage each other, so that as the rotation of the half-couplings is continued each valve will be rotated sufficiently for its pins $e$ to be brought back of the shoulders $c'$. The couplings will then be in line, and will hang so in their ordinary position. The coupling-ports will be open between cars, and the train will be in running order, though it should be stated that the last half-coupling in the train will have a closed valve, that being the normal position of the valves when the couplings are separated otherwise than by accident. If now a car is to be detached, the rotation of the couplings in the reverse direction will bring the pins $e$ back into the slots $c$, so that as the couplings separate the valves will be seated. But in the case of an accident which results in one or more cars being detached from the train, the two half-couplings, at the point of detachment, will be separated, not by a rotary motion of one half-coupling on the other, but by a straight endwise pull, which in separating the half-couplings will leave the pins $e$ free to drop onto or engage the shoulders $c'$, as a result of which the valves will be locked in an open position; hence, the air being free to escape, the brakes will be applied both forward and back of the place of detachment in the well-known way. Hence, when the couplings are disconnected intentionally and in the proper manner the valves will always be closed. When the couplings are united the valves will always be open; but when the couplings are forcibly pulled apart, as in an accident, the valves are automatically locked in an open condition. And such are the desirable conditions of use.

Any suitable skeleton or open frame-work, made in one or more pieces, may take the place of the ring B, as the mechanical equivalent thereof, and any of the known forms of bayonet or other similar joint may be substituted for the recess $c$ and shoulder $c'$, or, in fact, any similarly-operating interlocking gear may be substituted, without any substantial departure from the scope of my invention.

I claim herein as my invention—

1. In combination with a half-coupling, a valve automatically locked in an open or unseated position on the accidental or improper separation of such half-coupling from its fellow, substantially as set forth.

2. In a pair of couplings adapted to be united by a rotary motion, a pair of valves adapted to engage each other, and not only be forced back off their seats, but also be rotated to a position where, on the accidental or improper separation of the couplings, they will be automatically locked in an open or unseated position, substantially as set forth.

3. The combination of ring B, having holes, ports, or recesses through or past the same, valve D, and a bayonet-joint for locking and unlocking the valve, substantially as set forth.

4. The valve D, having thereon one part of an interlocking-connection, a ring, B, or its described equivalent, containing the other part of such interlocking connection, in combination with a shoulder, $s$, on the end of the valve-stem $d$, substantially as set forth.

In testimony whereof I have hereunto set my hand.

CHARLES G. WELCH.

Witnesses:
ROYAL H. BUSSLER,
JOHN M. WIESEL.